(12) United States Patent
Hirata et al.

(10) Patent No.: US 10,405,028 B2
(45) Date of Patent: Sep. 3, 2019

(54) CONTENT REPRODUCTION APPARATUS AND CONTENT REPRODUCTION METHOD

(71) Applicant: Sony Corporation, Tokyo (JP)

(72) Inventors: Minoru Hirata, Kanagawa (JP);
Noriaki Ooishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/762,690

(22) PCT Filed: Oct. 21, 2016

(86) PCT No.: PCT/JP2016/081240
§ 371 (c)(1),
(2) Date: Mar. 23, 2018

(87) PCT Pub. No.: WO2017/077881
PCT Pub. Date: May 11, 2017

(65) Prior Publication Data
US 2018/0262800 A1    Sep. 13, 2018

(30) Foreign Application Priority Data
Nov. 5, 2015  (JP) .................................. 2015-217859

(51) Int. Cl.
*H04N 21/236*    (2011.01)
*H04N 21/43*    (2011.01)
(Continued)

(52) U.S. Cl.
CPC ......... *H04N 21/4341* (2013.01); *H04L 65/60* (2013.01); *H04N 21/43* (2013.01);
(Continued)

(58) Field of Classification Search
None
See application file for complete search history.

(56) References Cited

U.S. PATENT DOCUMENTS 5,396,497 A * 3/1995 Veltman ............... H04N 5/9206
348/465
6,314,234 B1 * 11/2001 Kawamura ...... G11B 20/00007
386/241
(Continued)

FOREIGN PATENT DOCUMENTS

EP    1585336 A1    10/2005
JP    5708866 B1    4/2015
(Continued)

OTHER PUBLICATIONS

"MMT-Based Media Transport Scheme in Digital Broadcasting Systems," ARIB Standard, ARIB STD-B60 Ver.1.2, pp. 1-11, Jul. 31, 2014.
(Continued)

*Primary Examiner* — Linda Wong
(74) *Attorney, Agent, or Firm* — Michael Best & Friedrich LLP

(57) ABSTRACT

The present disclosure relates to a content reproduction apparatus and a content reproduction method for reproducing content corresponding to media transport schemes with different system clock frequencies. In one example, a content reproduction apparatus includes an acquisition unit that acquires a first multiplexed stream generated on the basis of a first system clock with a first frequency; a demultiplexing unit that separates encoded data and presentation time information from the acquired first multiplexed stream; a system clock generation unit that generates a second system clock with a second frequency; a conversion unit that numerically converts the separated presentation time information into a value on an axis of the second frequency; and a decoding unit that decodes the separated encoded data and that presents, according to the numerically converted presentation time information, a decoded signal obtained as a result of the decoding.

16 Claims, 8 Drawing Sheets

(51) Int. Cl.
*H04N 21/434* (2011.01)
*H04L 29/06* (2006.01)
*H04N 21/462* (2011.01)

(52) U.S. Cl.
CPC ....... *H04N 21/434* (2013.01); *H04N 21/4305* (2013.01); *H04N 21/4622* (2013.01); *H04N 21/23614* (2013.01)

(56) References Cited

U.S. PATENT DOCUMENTS

| | | | | |
|---|---|---|---|---|
| 7,796,599 | B2* | 9/2010 | Jung | H04L 1/0083 370/392 |
| 2005/0190872 | A1* | 9/2005 | Seong | H04N 21/23608 375/354 |
| 2008/0145020 | A1* | 6/2008 | Tsuruga | G11B 20/10527 386/326 |
| 2009/0116814 | A1* | 5/2009 | Morohashi | H04N 5/92 386/248 |
| 2012/0200772 | A1 | 8/2012 | Minagawa et al. | |
| 2013/0235268 | A1* | 9/2013 | Suzuki | H04N 7/083 348/462 |
| 2015/0101004 | A1* | 4/2015 | Kitazato | H04N 21/4307 725/131 |

FOREIGN PATENT DOCUMENTS

| | | |
|---|---|---|
| WO | 2015/011915 A1 | 1/2015 |
| WO | 2016/125654 A1 | 8/2016 |

OTHER PUBLICATIONS

Extended European Search Report dated Jun. 21, 2019 for corresponding European Application No. 16861944.3.

* cited by examiner

F I G . 5
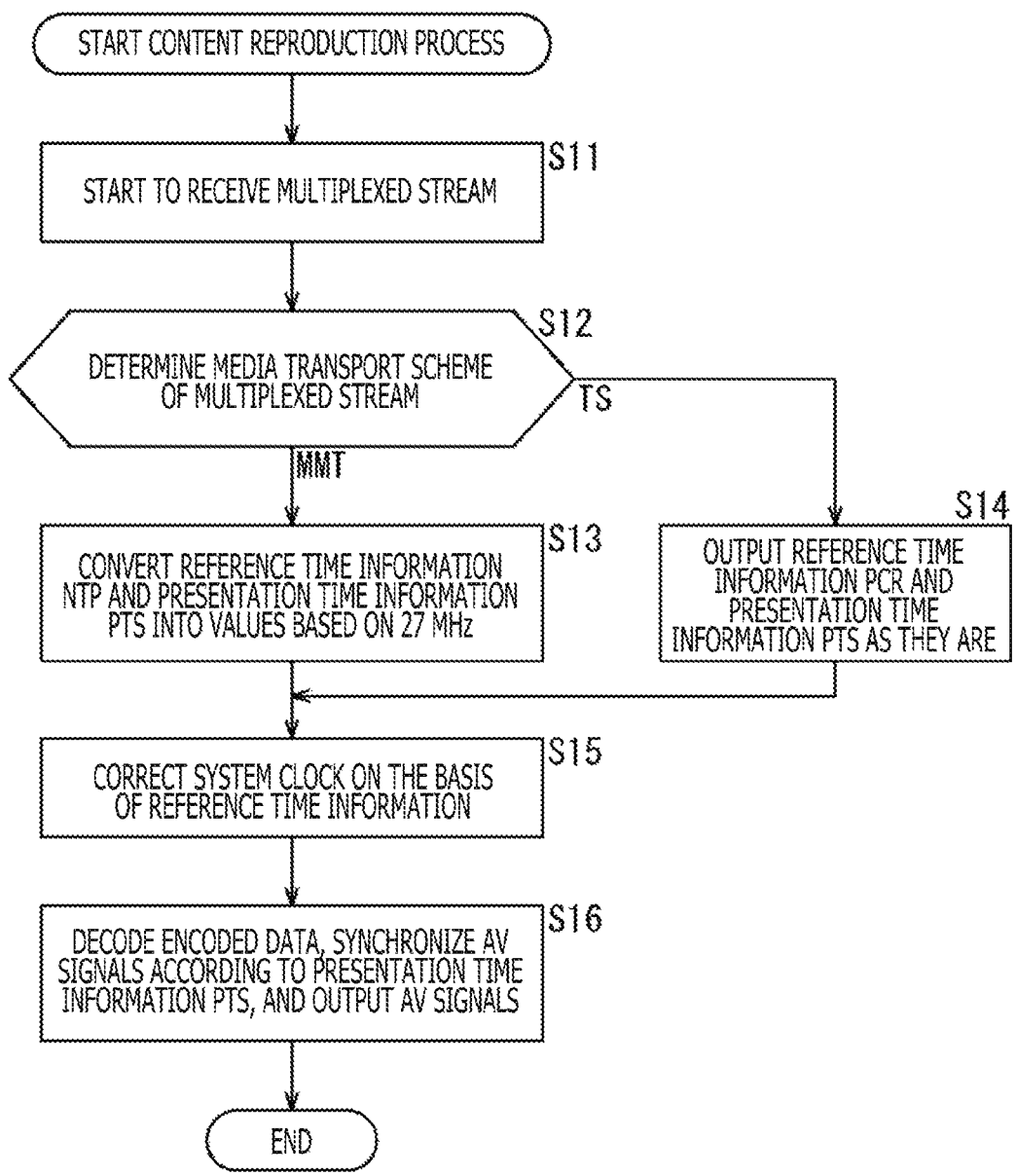

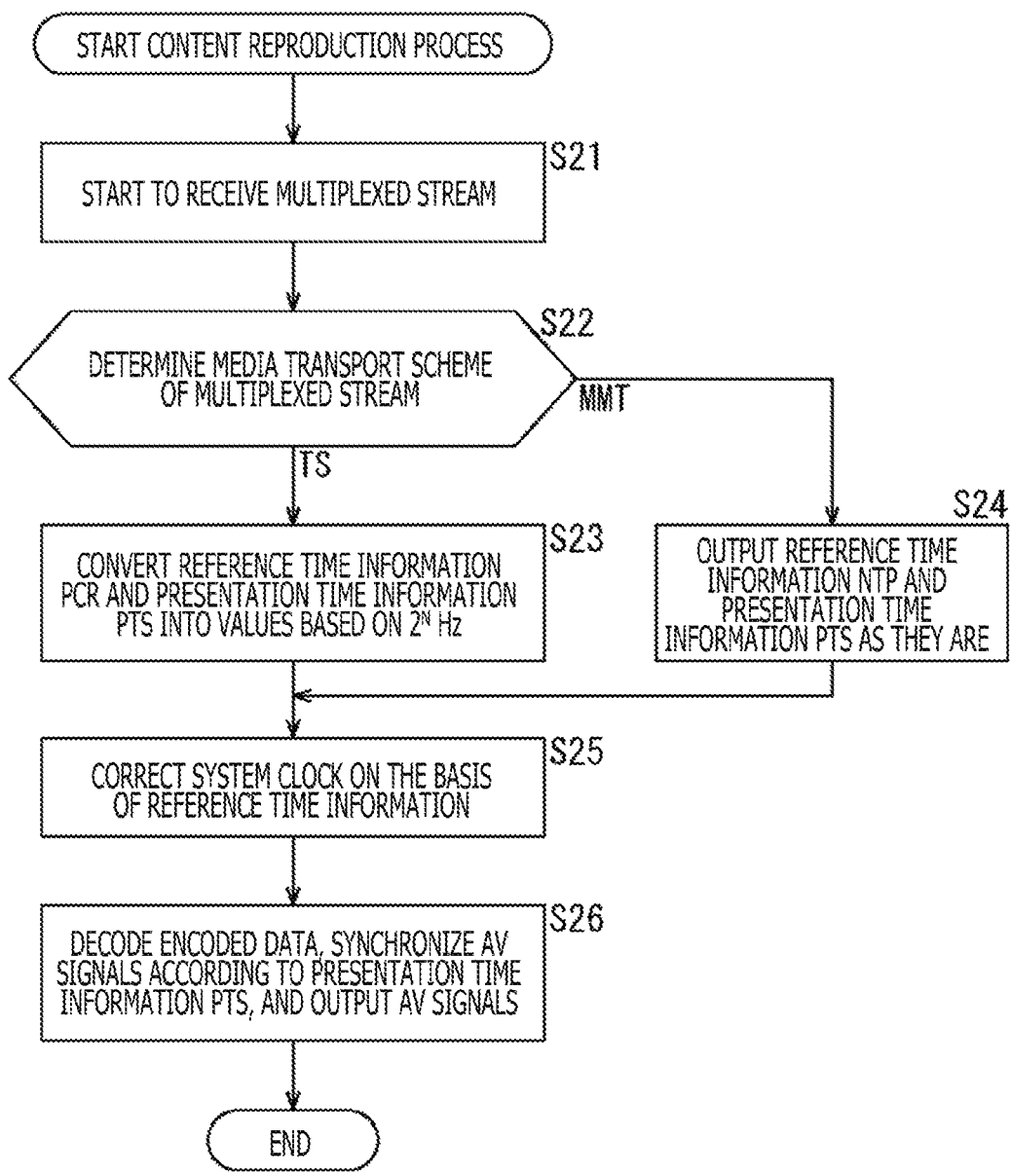

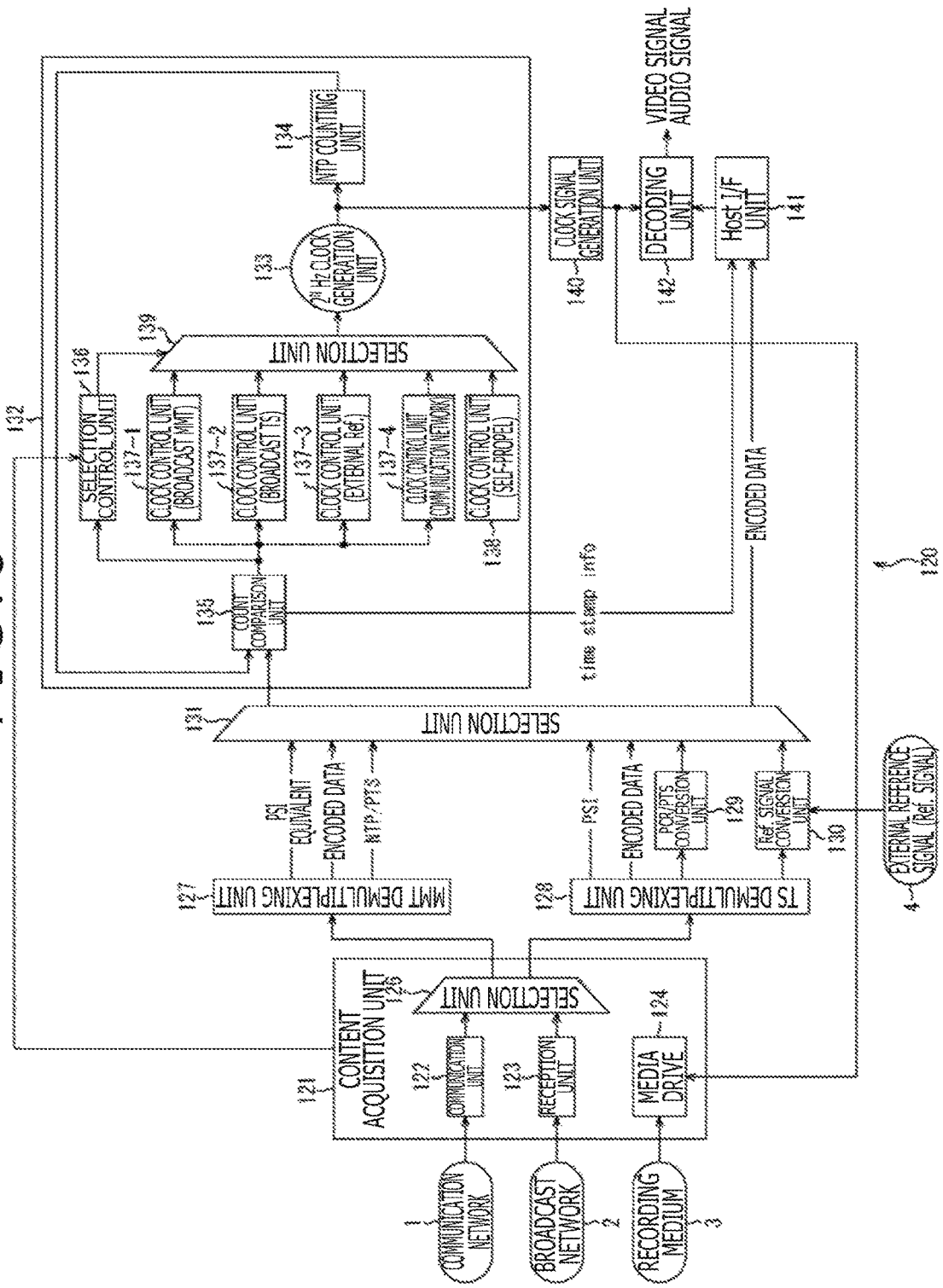

CONTENT REPRODUCTION APPARATUS AND CONTENT REPRODUCTION METHOD

TECHNICAL FIELD

The present disclosure relates to a content reproduction apparatus and a content reproduction method, and particularly, to a content reproduction apparatus and a content reproduction method that can reproduce content corresponding to each of standards with different system clock frequencies.

BACKGROUND ART

Currently, MPEG2 TS with a system clock frequency of 27 [MHz] is implemented in a media transport scheme of digital television broadcasting, and in the future, implementation of MMT (MPEG Media Transport) with a system clock frequency of $2^N$ [Hz] is scheduled (for example, see NPL 1).

Therefore, both content corresponding to MPEG2 TS and content corresponding to MMT may be present in a period of transmission of the media transport scheme from MPEG2 TS to MMT, and a content reproduction apparatus that can receive and reproduce both types of content is necessary.

The system clock frequencies of MPEG2 TS and MMT are different as described above, and the content reproduction apparatus can be provided with two types of system clock lines having similar configurations, in which only the system clock frequencies are different.

FIG. 1 illustrates an example of a configuration of a content reproduction apparatus that can be conceived in the past, the content reproduction apparatus capable of receiving and reproducing both content corresponding to MPEG2 TS and content corresponding to MMT.

A content reproduction apparatus 10 mainly includes a content acquisition unit 11, an MMT processing unit 15, a TS processing unit 24, a selection unit 33, and a decoding unit 34.

The content acquisition unit 11 includes a communication unit 12, a reception unit 13, and a selection unit 14.

The communication unit 12 acquires a multiplexed stream corresponding to MMT or MPEG2 TS through a communication network 1 represented by the Internet and outputs the multiplexed stream to the selection unit 14. The reception unit 13 receives the multiplexed stream corresponding to MMT or MPEG2 TS through a broadcast network 2, such as a terrestrial broadcast network, a satellite broadcast network, and a CATV network, and outputs the multiplexed stream to the selection unit 14.

The selection unit 14 selects an output destination of the input multiplexed stream according to the media transport scheme of the multiplexed stream. Specifically, the selection unit 14 outputs the multiplexed stream corresponding to MMT to a demultiplexing unit 16 of the MMT processing unit 15 and outputs the multiplexed stream corresponding to MPEG2 TS to a demultiplexing unit 25 of the TS processing unit 24.

The MMT processing unit 15 belonging to the system clock line of MMT includes the demultiplexing unit 16, a clock recovery unit 17, a clock signal generation unit 22, and a Host I/F unit 23.

The demultiplexing unit 16 separates encoded data of the content from the multiplexed stream data corresponding to MMT and outputs the encoded data to the Host I/F unit 23. The demultiplexing unit 16 also separates a PSI (Program Specific Information) equivalent, a reference time information NTP (Network Time Protocol), and a presentation time information PTS (Presentation Time Stamp) from the multiplexed stream data corresponding to MMT and outputs them to the clock recovery unit 17.

The clock recovery unit 17 includes a clock generation unit 18, an NTP equivalent counting unit 19, a count comparison unit 20, and a clock control unit 21.

On the basis of a difference between the reference time information NTP input from the demultiplexing unit 16 and an NTP equivalent count value generated in the clock recovery unit 17, the clock recovery unit 17 controls the clock generation unit 18 that generates a system clock of $2^N$ [Hz]. The clock recovery unit 17 recovers a system clock on the transmission side of the content (synchronizes with the system clock on the transmission side of the content) and outputs the recovered system clock to the clock signal generation unit 22.

The count comparison unit 20 of the clock recovery unit 17 sets, as Time Stamp Info, the reference time information NTP and the presentation time information PTS input from the demultiplexing unit 16 and outputs the Time Stamp Info to the Host I/F unit 23.

The clock signal generation unit 22 generates a baseband clock signal necessary for decoding the encoded data of MMT on the basis of the recovered system clock of $2^N$ [Hz] and outputs the baseband clock signal to the selection unit 33. The Host I/F unit 23 outputs the encoded data, the reference time information NTP, and the presentation time information PTS input from the earlier stage to the selection unit 33.

Meanwhile, the TS processing unit 24 belonging to the system clock line of MPEG2 TS also has a configuration similar to the MMT processing unit 15. More specifically, the TS processing unit 24 includes the demultiplexing unit 25, a clock recovery unit 26, a clock signal generation unit 31, and a Host I/F unit 32.

The demultiplexing unit 25 separates encoded data of the content from the multiplexed stream data corresponding to MPEG2 TS and outputs the encoded data to the Host I/F unit 32. The demultiplexing unit 25 also separates PSI, a reference time information PCR (Program Clock Reference), and a presentation time information PTS from the multiplexed stream data corresponding to MPEG2 TS and outputs them to the clock recovery unit 26.

The clock recovery unit 26 includes a clock generation unit 27, an STC counting unit 28, a count comparison unit 29, and a clock control unit 30.

On the basis of a difference between the reference time information PCR and the presentation time information PTS input from the demultiplexing unit 25 as well as an STC (System Time Clock) count value generated in the clock recovery unit 17, the clock recovery unit 26 controls the clock generation unit 27 that generates a system clock of 27 [MHz]. The clock recovery unit 26 recovers the system clock on the transmission side of the content (synchronizes with the system clock on the transmission side of the content) and outputs the recovered system clock to the clock signal generation unit 31.

The count comparison unit 29 of the clock recovery unit 26 sets, as Time Stamp Info, the reference time information PCR and the presentation time information PTS input from the demultiplexing unit 25 and outputs the Time Stamp Info to the Host I/F unit 32.

The clock signal generation unit 31 generates a baseband clock signal necessary for decoding the encoded data of MPEG2 TS on the basis of the recovered system clock of 27 [MHz] and outputs the baseband clock signal to the selection unit 33. The Host I/F unit 32 outputs the encoded data, the reference time information PCR, and the presentation time information PTS input from the earlier stage to the selection unit 33.

The selection unit 33 outputs, to the decoding unit 34, a set of the baseband clock signal, the encoded data, the reference time information NTP, and the presentation time information PTS synchronized with the system clock of $2^N$ [Hz] input from the MMT processing unit 15 or a set of the baseband clock signal, the encoded data, the reference time information PCR, and the presentation time information PTS synchronized with the system clock of 27 [MHz] input from the TS processing unit 24.

The decoding unit 34 decodes the encoded data according to the baseband clock signal input from the MMT processing unit 15 through the selection unit 33. The decoding unit 34 synchronizes a video signal and an audio signal obtained as a result of the decoding on the basis of the presentation time information PTS and outputs the video signal and the audio signal to the later stage. The decoding unit 34 also decodes the encoded data encoded data according to the baseband clock signal input from the TS processing unit 24 through the selection unit 33. The decoding unit 34 synchronizes a video signal and an audio signal obtained as a result of the decoding on the basis of the presentation time information PTS and outputs the video signal and the audio signal to the later stage.

CITATION LIST

Non Patent Literature

[NPL 1]
ARIB STD-B60, Version 1.2, MMT-Based Media Transport Scheme in Digital Broadcasting Systems, Mar. 17, 2015

SUMMARY

Technical Problem

According to the content reproduction apparatus 10 illustrated in FIG. 1, both the content corresponding to MPEG2 TS and the content corresponding to MMT can be received and reproduced.

However, the MMT processing unit 15 and the TS processing unit 24 with similar configurations are provided as illustrated in FIG. 1. This increases the number of components and the implementation scale, and the manufacturing cost becomes high. This also increases the power consumption, and there is a problem that the cost of using the apparatus also becomes high.

Furthermore, two types of clock generation units 18 and 27 are provided, and EMI radiation is easily generated. Therefore, measures for preventing the influence of the EMI radiation also need to be taken.

Note that to reduce the power consumption or to take measures for the EMI radiation, there can be a method of supplying power to only used one of the MMT processing unit 15 and the TS processing unit 24 with similar configurations.

However, in that case, a circuit that turns on and off the supply of power to the MMT processing unit 15 and the TS processing unit 24 or a circuit that prevents supply of a signal to IO connection of the component not supplied with power needs to be added, or components that allow input of external signals even during power shutdown need to be used. Therefore, there is a problem that the manufacturing cost also becomes high in this case.

The present disclosure has been made in view of the circumstances, and the present disclosure is designed to realize, at a low cost, a content reproduction apparatus that can reproduce content corresponding to each of media transport schemes with different system clock frequencies.

Solution to Problem

An aspect of the present disclosure provides a content reproduction apparatus including an acquisition unit that acquires a first multiplexed stream generated on the basis of a first system clock with a first frequency; a demultiplexing unit that separates encoded data and presentation time information from the acquired first multiplexed stream; a system clock generation unit that generates a second system clock with a second frequency different from the first frequency; a conversion unit that numerically converts the presentation time information separated from the first multiplexed stream into a value on an axis of the second frequency; and a decoding unit that decodes the encoded data separated from the first multiplexed stream and that presents, according to the numerically converted presentation time information, a decoded signal obtained as a result of the decoding.

The acquisition unit can also acquire a second multiplexed stream generated on the basis of the second system clock, the demultiplexing unit can also separate encoded data and presentation time information from the acquired second multiplexed stream, and the decoding unit can decode the encoded data separated from the second multiplexed stream and present a decoded signal obtained as a result of the decoding according to the presentation time information separated from the second multiplexed stream.

The demultiplexing unit can further separate reference time information from the acquired first multiplexed stream, the conversion unit can also numerically convert the reference time information separated from the first multiplexed stream into a value on the axis of the second frequency, and the content reproduction apparatus according to the aspect of the present disclosure can further include a clock control unit that controls the system clock generation unit that generates the second system clock on the basis of the numerically converted reference time information.

The demultiplexing unit can also further separate reference time information from the acquired second multiplexed stream, and the clock control unit can further control the system clock generation unit that generates the second system clock on the basis of the reference time information separated from the second multiplexed stream.

The clock control unit can further control the system clock generation unit that generates the second system clock according to transmission route information of the acquired first or second multiplexed stream.

The content reproduction apparatus according to the aspect of the present disclosure can further include an external reference time information generation unit that numerically converts, into a value on the axis of the second frequency, a synchronization signal separated from an external reference signal with a third frequency different from the first and second frequencies and that generates external reference time information on the basis of the numerically converted synchronization signal, in which the clock control unit can further control the system clock generation unit that generates the second system clock on the basis of the generated external reference time information.

The clock control unit can further control the system clock generation unit that generates the second system clock such that the system clock generation unit self-propels.

The first frequency can be 27 [MHz], a media transport scheme of the first multiplexed stream can be MPEG-2 TS, the reference time information separated from the first multiplexed stream can be PCR, and the presentation time information separated from the first multiplexed stream can be PTS, and the second frequency can be $2^N$ [Hz], a media transport scheme of the second multiplexed stream can be MMT, the reference time information separated from the second multiplexed stream can be NTP, and the presentation time information separated from the second multiplexed stream can be PTS.

The first frequency can be $2^N$ [Hz], the media transport scheme of the first multiplexed stream can be MMT, the reference time information separated from the first multiplexed stream can be NTP, and the presentation time information separated from the first multiplexed stream can be PTS, and the second frequency can be 27 [MHz], the media transport scheme of the second multiplexed stream can be MPEG-2 TS, the reference time information separated from the second multiplexed stream can be PCR, and the presentation time information separated from the second multiplexed stream can be PTS.

An aspect of the present disclosure provides a content reproduction method executed by a content reproduction apparatus, the content reproduction method including: an acquisition step of acquiring a first multiplexed stream generated on the basis of a first system clock with a first frequency; a demultiplexing step of separating encoded data and presentation time information from the acquired first multiplexed stream; a conversion step of numerically converting the presentation time information separated from the first multiplexed stream into a value on an axis of a second frequency different from the first frequency generated by a system clock generation unit; a decoding step of decoding the encoded data separated from the first multiplexed stream; and a presentation step of presenting, according to the numerically converted presentation time information, a decoded signal obtained as a result of the decoding.

According to the aspects of the present disclosure, the first multiplexed stream generated on the basis of the first system clock with the first frequency is acquired, the encoded data and the presentation time information are separated from the acquired first multiplexed stream, and the presentation time information separated from the first multiplexed stream is numerically converted into the value on the axis of the second frequency different from the first frequency generated by the system clock generation unit. The encoded data separated from the first multiplexed stream is further decoded, and the decoded signal obtained as a result of the decoding is presented according to the numerically converted presentation time information.

Advantageous Effect of Invention

According to the aspects of the present disclosure, a content reproduction apparatus that can reproduce content corresponding to each of media transport schemes with different system clock frequencies can be realized at a low cost.

BRIEF DESCRIPTION OF DRAWINGS

FIG. 5 is a flow chart describing a content reproduction process in the second configuration example of the content reproduction apparatus.

FIG. 7 is a flow chart describing a content reproduction process in the third configuration example of the content reproduction apparatus.

FIG. 8 is a block diagram illustrating a fourth configuration example of the content reproduction apparatus as an embodiment of the present disclosure.

DESCRIPTION OF EMBODIMENT

Hereinafter, the best mode (hereinafter, referred to as embodiment) for carrying out the present disclosure will be described in detail with reference to the drawings.

Figure 1:
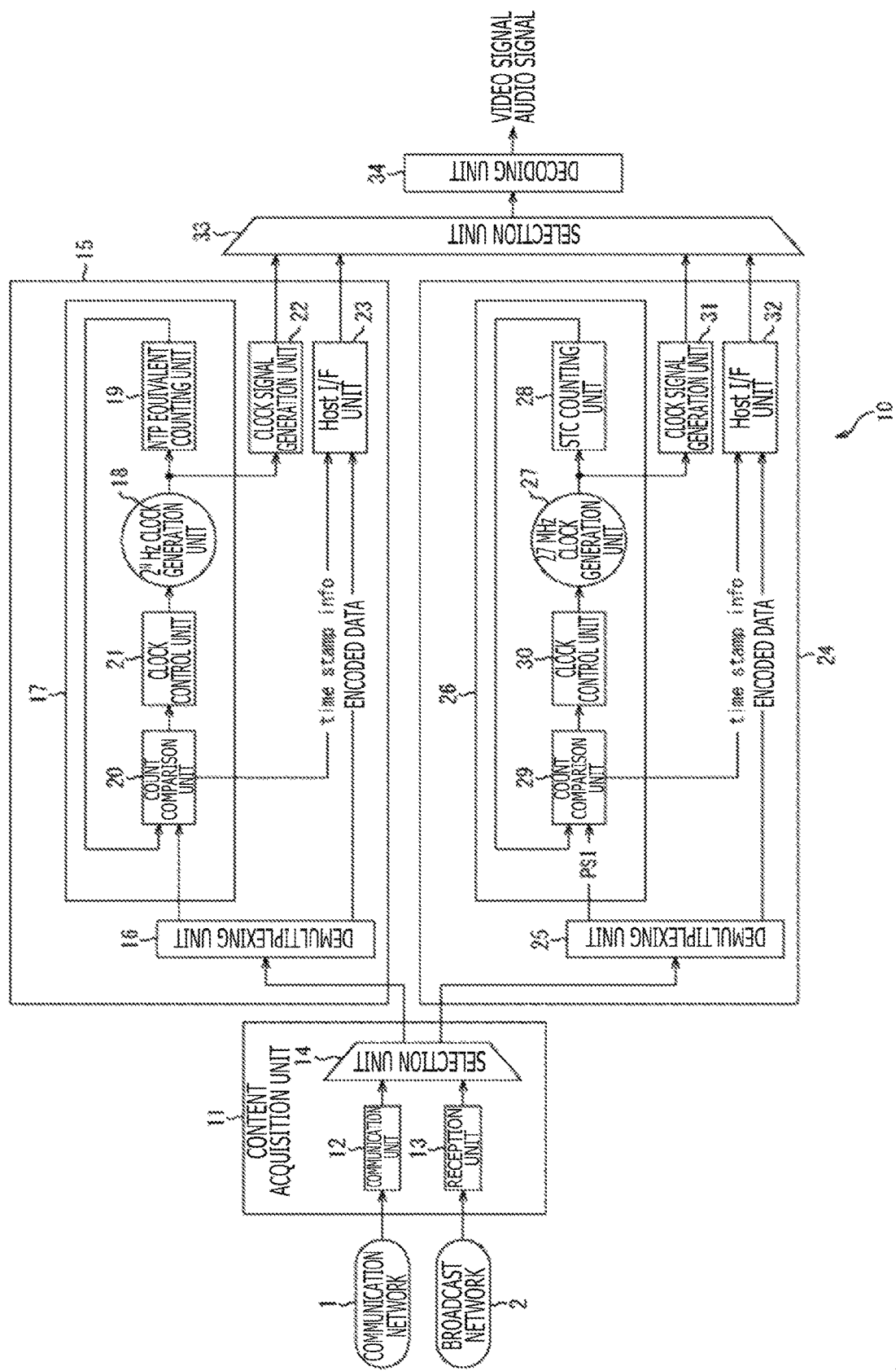
FIG. 1 is a block diagram illustrating an example of a configuration of a content reproduction apparatus that can be conceived in the past.
Figure 2:
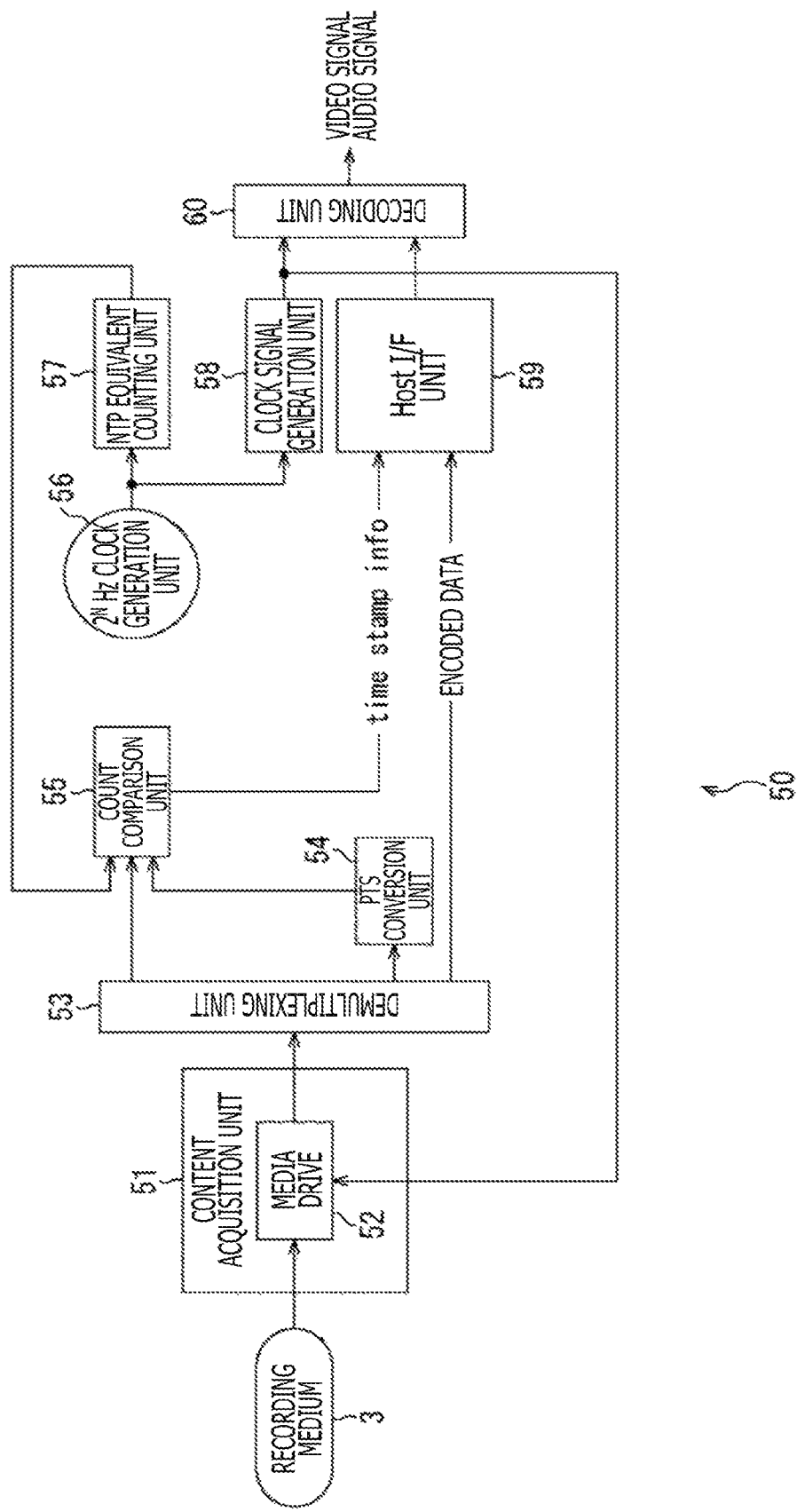
FIG. 2 is a block diagram illustrating a first configuration example of a content reproduction apparatus as an embodiment of the present disclosure.

First Configuration Example of Content Reproduction Apparatus as Embodiment of Present Disclosure FIG. 2 illustrates a first configuration example of a content reproduction apparatus as an embodiment of the present disclosure.

A content reproduction apparatus 50 reads and reproduces both content with a format scheme corresponding to MPEG2 TS and content with a format scheme corresponding to MMT recorded in a recording medium 3 represented by a BD (Blu-ray (registered trademark) Disc), a DVD (Digital Versatile Disc), and the like.

The content reproduction apparatus 50 mainly includes a content acquisition unit 51, a demultiplexing unit 53, a PTS conversion unit 54, a count comparison unit 55, a clock generation unit 56, an NTP equivalent counting unit 57, a clock signal generation unit 58, a Host I/F unit 59, and a decoding unit 60.

The content acquisition unit 51 includes a media drive 52. The media drive 52 reads a multiplexed stream corresponding to MMT or MPEG2 TS from the recording medium 3 while performing buffer management based on a baseband clock signal supplied from the clock signal generation unit 58 and outputs the multiplexed stream to the demultiplexing unit 53.

In the case where the format scheme of the multiplexed stream data input from the earlier stage is MMT, the demultiplexing unit 53 separates encoded data of the content from the multiplexed stream data and outputs the encoded data to the Host I/F unit 59. The demultiplexing unit 53 also separates a PSI equivalent and a presentation time information PTS from the multiplexed stream data and outputs the PSI equivalent and the presentation time information PTS to the count comparison unit 55.

In the case where the format scheme of the multiplexed stream data input from the earlier stage is MPEG2 TS, the demultiplexing unit 53 separates encoded data of the content from the multiplexed stream data and outputs the encoded data to the Host I/F unit 59. The demultiplexing unit 53 also separates PSI from the multiplexed stream data and outputs the PSI to the count comparison unit 55. The demultiplexing unit 53 further separates a presentation time information PTS from the multiplexed stream data and outputs the presentation time information PTS to the PTS conversion unit 54.

The PTS conversion unit 54 converts the presentation time information PTS separated from the multiplexed stream data corresponding to MPEG2 TS and input from the demultiplexing unit 53 into a value on a value axis provided on the basis of $2^N$ [Hz] that is a system clock frequency of MMT and outputs the converted presentation time information PTS to the count comparison unit 55.

The count comparison unit 55 sets the presentation time information PTS input from the demultiplexing unit 53 or the converted presentation time information PTS as Time Stamp Info and outputs the Time Stamp Info to the Host I/F unit 59.

The clock generation unit 56 generates a system clock of $2^N$ [Hz] corresponding to MMT and outputs the system clock to the NTP equivalent counting unit 57 and the clock signal generation unit 58. Note that the frequency of the system clock generated by the clock generation unit 56 may be a fixed value=$2^N$ [Hz] or may be variable.

The NTP equivalent counting unit 57 increments an NTP count value according to the system clock of $2^N$ [Hz] and feeds back the NTP count value to the count comparison unit 55.

The clock signal generation unit 58 generates a baseband clock signal necessary for decoding the encoded data on the basis of the system clock of $2^N$ [Hz] and outputs the baseband clock signal to the media drive 52 and the decoding unit 60.

The Host I/F unit 59 outputs the encoded data input from the demultiplexing unit 53 and the presentation time information PTS input from the count comparison unit 55 (including the case of the presentation time information PTS converted into the value of $2^N$ [Hz]) to the decoding unit 60.

The decoding unit 60 decodes the encoded data according to the baseband clock signal input from the earlier stage. On the basis of the presentation time information PTS, the decoding unit 60 synchronizes a video signal and an audio signal obtained as a result of the decoding and outputs the video signal and the audio signal to a later stage.

<Content Reproduction Process by Content Reproduction Apparatus 50>

Figure 3:
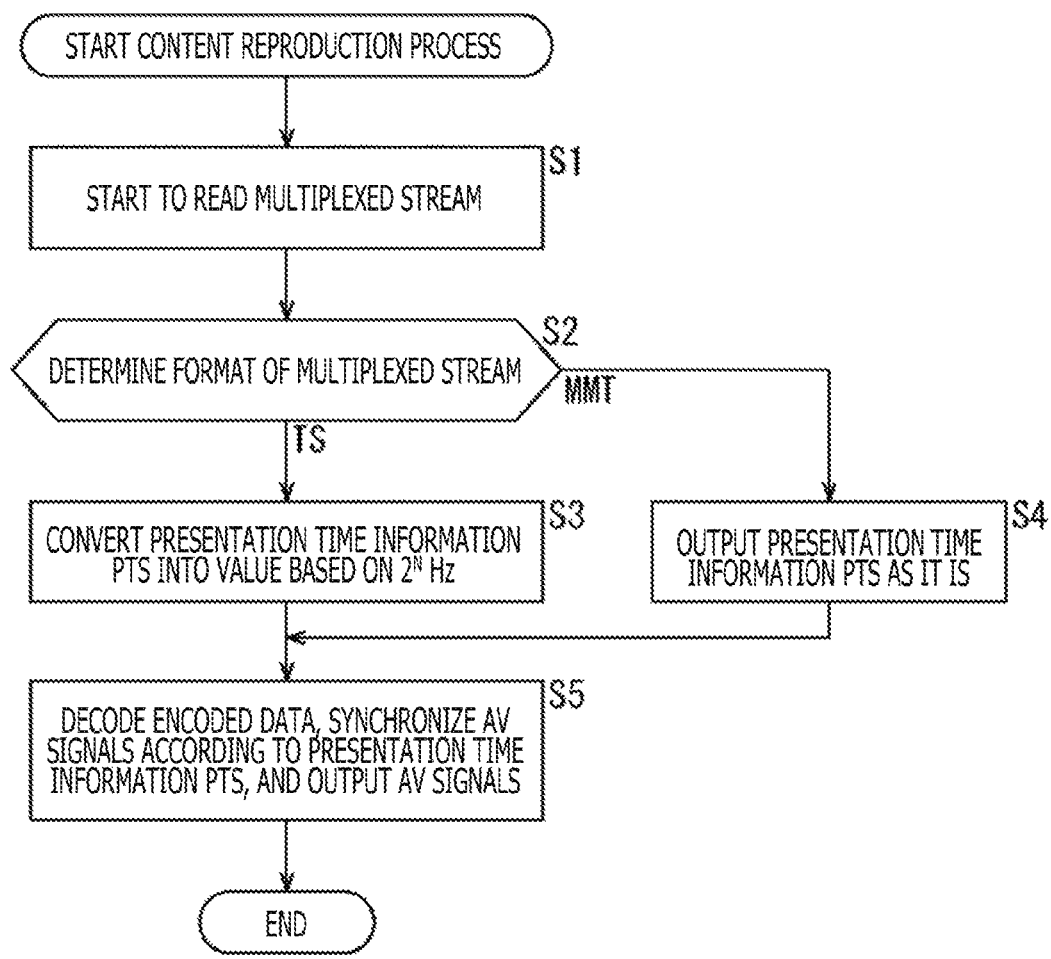
FIG. 3 is a flow chart describing a content reproduction process in the first configuration example of the content reproduction apparatus.

Next, FIG. 3 is a flow chart describing a content reproduction process by the content reproduction apparatus 50.

In step S1, the content acquisition unit 51 starts to read the multiplexed stream corresponding to MMT or MPEG2 TS recorded in the recording medium 3 and output the multiplexed stream to the demultiplexing unit 53.

In step S2, the demultiplexing unit 53 determines whether the format scheme of the input multiplexed stream data is MMT or MPEG2 TS. If the demultiplexing unit 53 determines that the format scheme is MPEG2 TS, the process proceeds to step S3.

In step S3, the demultiplexing unit 53 separates the encoded data of the content from the multiplexed stream data and outputs the encoded data to the Host I/F unit 59. The demultiplexing unit 53 also separates the PSI from the multiplexed stream data and outputs the PSI to the count comparison unit 55. The demultiplexing unit 53 further separates the presentation time information PTS from the multiplexed stream data and outputs the presentation time information PTS to the PTS conversion unit 54. The PTS conversion unit 54 converts the presentation time information PTS into a value on the value axis provided on the basis of $2^N$ [Hz] that is a system clock frequency of MMT and outputs the converted presentation time information PTS to the count comparison unit 55. The count comparison unit 55 sets the converted presentation time information PTS input from the demultiplexing unit 53 as Time Stamp Info and outputs the Time Stamp Infor to the Host I/F unit 59.

On the other hand, if the demultiplexing unit 53 determines that the format scheme of the multiplexed stream is MMT in step S2, the process proceeds to step S4. In step S4, the demultiplexing unit 53 separates the encoded data of the content from the multiplexed stream data and outputs the encoded data to the Host I/F unit 59. The demultiplexing unit 53 also separates the PSI equivalent and the presentation time information PTS from the multiplexed stream data and outputs the PSI equivalent and the presentation time information PTS to the count comparison unit 55 as they are. The count comparison unit 55 sets the presentation time information PTS as Time Stamp Info and outputs the Time Stamp Info to the Host I/F unit 59.

In step S5, the decoding unit 60 decodes the encoded data according to the baseband clock signal input from the clock signal generation unit 58. On the basis of the presentation time information PTS, the decoding unit 60 also synchronizes the video signal and the audio signal obtained as a result of the decoding and outputs the video signal and the audio signal to the later stage. This completes the description of the content reproduction process by the content reproduction apparatus 50.

According to the content reproduction apparatus 50, the presentation time information PTS can be used as it is to synchronize and output the AV signals for the multiplexed stream corresponding to MMT recorded in the recording medium 3. On the other hand, the presentation time information PTS converted into the value based on $2^N$[Hz] can be used to synchronize and output the AV signals for the multiplexed stream corresponding to MEPG2 TS recorded in the recording medium 3.

The content reproduction apparatus 50 is provided with only the clock generation unit 56 that generates the system clock of $2^N$ [Hz], and generation of EMI radiation can be prevented.

Note that in a modification of the content reproduction apparatus 50, the clock generation unit 56 may generate a system clock of 27 [MHz] corresponding to MPEG2 TS, and the PTS conversion unit 54 may convert the presentation time information PTS separated from the multiplexed stream data corresponding to MMT and input from the demultiplexing unit 53 into a value on the value axis provided on the basis of 2M [Hz] that is a system clock frequency of MPEG2 TS.

According to the modification, the presentation time information PTS can be used as it is to synchronize and output the AV signals for the multiplexed stream corresponding to MPEG2 TS recorded in the recording medium 3. On the other hand, the presentation time information PTS converted into the value based on 27 [MHz] can be used to synchronize and output the AV signals for the multiplexed stream corresponding to MMT recorded in the recording medium 3.

Figure 4:
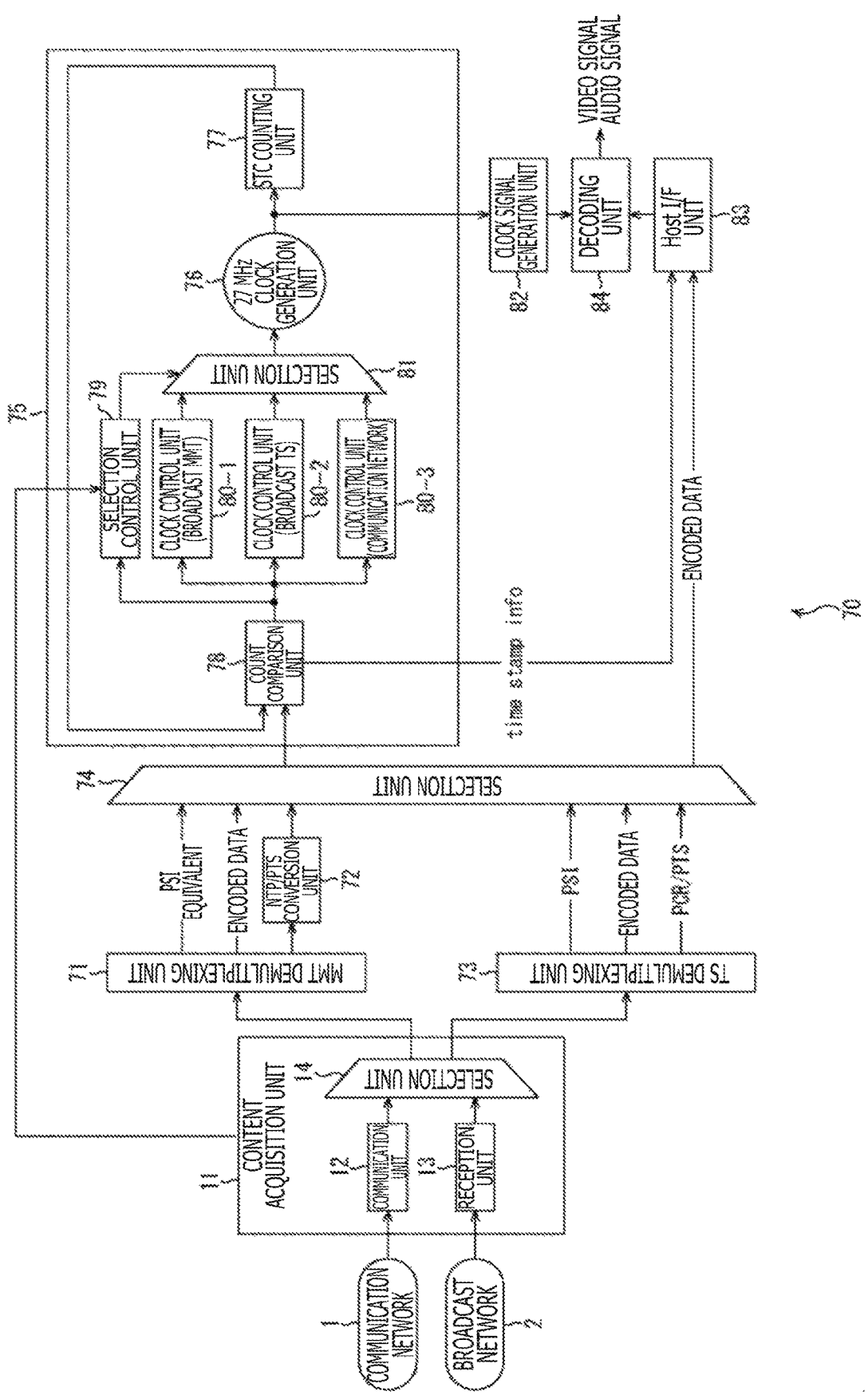
FIG. 4 is a block diagram illustrating a second configuration example of the content reproduction apparatus as an embodiment of the present disclosure.

Second Configuration Example of Content Reproduction Apparatus as Embodiment of Present Disclosure Next, FIG. 4 illustrates a second configuration example of the content reproduction apparatus as an embodiment of the present disclosure.

A content reproduction apparatus 70 is configured to correct and use a system clock of 27 [MHz] generated by a built-in clock generation unit 76 on the basis of a reference time information PCR or NTP from a supply source (such as a broadcast station) of the content.

The content reproduction apparatus 70 mainly includes a content acquisition unit 11, an MMT demultiplexing unit 71, an NTP/PTS conversion unit 72, a TS demultiplexing unit 73, a selection unit 74, a clock recovery unit 75, a clock signal generation unit 82, a Host I/F unit 83, and a decoding unit 84.

The content acquisition unit 11 includes a communication unit 12, a reception unit 13, and a selection unit 14.

The communication unit 12 acquires a multiplexed stream corresponding to MMT or MPEG2 TS through a communication network 1 represented by the Internet and outputs the multiplexed stream to the selection unit 14. The reception unit 13 receives the multiplexed stream corresponding to MMT or MPEG2 TS through a broadcast network 2, such as a terrestrial broadcast network, a satellite broadcast network, and a CATV network, and outputs the multiplexed stream to the selection unit 14.

The selection unit 14 selects an output destination of the multiplexed stream input from the communication unit 12 or the reception unit 13 according to the media transport scheme of the multiplexed stream. Specifically, the selection unit 14 outputs the multiplexed stream corresponding to MMT to the MMT demultiplexing unit 71 and outputs the multiplexed stream corresponding to MPEG2 TS to the TS demultiplexing unit 73.

The content acquisition unit 11 transfers transmission route information to a selection control unit 79 of the clock recovery unit 75. Here, the transmission route information includes information related to a transmission path and an acquisition source of the multiplexed stream and includes the media transport scheme (format scheme).

The MMT demultiplexing unit 71 separates encoded data of the content from the multiplexed stream data corresponding to MMT and outputs the encoded data to the selection unit 74. The MMT demultiplexing unit 71 also separates a PSI equivalent from the multiplexed stream data and outputs the PSI equivalent to the selection unit 74. The MMT demultiplexing unit 71 further separates a reference time information NTP and a presentation time information PTS from the multiplexed stream data and outputs the reference time information NTP and the presentation time information PTS to the NTP/PTS conversion unit 72.

The NTP/PTS conversion unit 72 converts the reference time information NTP and the presentation time information PTS input from the MMT demultiplexing unit 71 into values on a value axis provided on the basis of 27 [MHz] that is a system clock frequency of MPEG2 TS and outputs the converted reference time information NTP and presentation time information PTS to the selection unit 74.

The TS demultiplexing unit 73 separates encoded data of the content from the multiplexed stream data corresponding to MPEG2 TS and outputs the encoded data to the selection unit 74. The TS demultiplexing unit 73 also separates PSI from the multiplexed stream data and outputs the PSI to the selection unit 74. The TS demultiplexing unit 73 further separates a reference time information PCR and a presentation time information PTS from the multiplexed stream data and outputs the reference time information PCR and the presentation time information PTS to the selection unit 74.

The selection unit 74 selects an input source of the series of data to be output to the later stage according to the media transport scheme of the multiplexed stream acquired by the content acquisition unit 11.

Specifically, in the case where the media transport scheme of the multiplexed stream is MMT, the selection unit 74 outputs the encoded data input from the MMT demultiplexing unit 71 to the Host I/F unit 83 and outputs the PSI equivalent input from the MMT demultiplexing unit 71 as well as the converted reference time information NTP and presentation time information PTS input from the NTP/PTS conversion unit 72 to the clock recovery unit 75.

On the other hand, in the case where the media transport scheme of the multiplexed stream is MEG2 TS, the selection unit 74 outputs the encoded data input from the TS demultiplexing unit 73 to the Host I/F unit 83 and outputs the PSI as well as the reference time information PCR and the presentation time information PTS input from the TS demultiplexing unit 73 to the clock recovery unit 75.

The clock recovery unit 75 includes the clock generation unit 76, an STC counting unit 77, a count comparison unit 78, the selection control unit 79, a clock control unit (broadcast MMT) 80-1, a clock control unit (broadcast TS) 80-2, a clock control unit (communication network) 80-3, and a selection unit 81.

The clock generation unit 76 generates a system clock of 27 [MHz] corresponding to MPEG2 TS and outputs the system clock to the STC counting unit 77 and the clock signal generation unit 82. The STC counting unit 77 increments an STC count value according to the system clock of 27 [MHz] and feeds back the STC count value to the count comparison unit 78.

The count comparison unit 78 outputs a difference between the fed back STC count value and the converted reference time information NTP input through the selection unit 74 as well as the PSI equivalent to the clock control unit (broadcast MMT) 80-1 and the clock control unit (communication network) 80-3. The count comparison unit 78 further outputs the difference between the fed back STC count value and the converted reference time information NTP input through the selection unit 74 to the selection control unit 79.

The count comparison unit 78 also outputs a difference between the fed back STC count value and the reference time information PCR input through the selection unit 74 as well as the PSI to the clock control unit (broadcast TS) 80-2 and the clock control unit (communication network) 80-3. The count comparison unit 78 further outputs the difference between the fed back STC count value and the reference time information PCR input through the selection unit 74 to the selection control unit 79.

The count comparison unit 78 also sets, as Time Stamp Info, the converted reference time information NTP and presentation time information PTS or the reference time information PCR and the presentation time information PTS input through the selection unit 74 and outputs the Time Stamp Info to the Host I/F unit 83.

The selection control unit 79 controls the output of the selection unit 81 on the basis of the transmission route information transferred from the content acquisition unit 11 and on the basis of the difference from the STC count value input from the count comparison unit 78.

The clock control unit (broadcast MMT) 80-1 generates a control signal for executing a clock recovery process according to transmission conditions, such as jitter characteristics, of the broadcast network 2 as a transmission path on the basis of the input from the count comparison unit 78 and outputs the control signal to the selection unit 81.

The clock control unit (broadcast TS) 80-2 generates a control signal for executing a clock recovery process according to the transmission conditions, such as jitter characteristics, of the broadcast network 2 as a transmission path on the basis of the input from the count comparison unit 78 and outputs the control signal to the selection unit 81.

The clock control unit (communication network) 80-3 generates a control signal for executing a clock recovery process according to transmission conditions, such as jitter characteristics, of the communication network 1 as a transmission path on the basis of the input from the count comparison unit 78 and outputs the control signal to the selection unit 81.

The selection unit 81 selects an input source of the control signal to be output to the clock generation unit 76 according to the control by the selection control unit 79. Specifically, the selection unit 81 outputs the control signal input from the clock control unit (broadcast MMT) 80-1 to the clock generation unit 76 in the case where the acquisition source of the multiplexed stream is the broadcast network 2 and the media transport scheme is MMT. The selection unit 81 outputs the control signal input from the clock control unit (broadcast TS) 80-2 to the clock generation unit 76 in the case where the acquisition source of the multiplexed stream is the broadcast network 2 and the media transport scheme is MPEG2 TS. The selection unit 81 outputs the control signal input from the clock control unit (communication network) 80-3 to the clock generation unit 76 in the case where the acquisition source of the multiplexed stream is the communication network 1.

Therefore, the selection unit 74 and the selection unit 81 are basically switched at the same time according to the acquisition source of the multiplexed stream acquired by the content acquisition unit 11 and the media transport scheme. However, the selection unit 74 and the selection unit 81 may be separately switched. The selection unit 81 may be adaptively switched during the operation of reception and reproduction.

The clock signal generation unit 82 generates a baseband clock signal necessary for decoding the encoded data on the basis of the system clock of 27 [MHz] and outputs the baseband clock signal to the decoding unit 84.

The Host I/F unit 83 outputs, to the decoding unit 84, the encoded data input through the selection unit 74 as well as the converted reference time information NTP and presentation time information PTS or the reference time information PCR and the presentation time information PTS input as the Time Stamp Info from the count comparison unit 78.

The decoding unit 84 decodes the encoded data according to the baseband clock signal input from the clock signal generation unit 82. On the basis of the presentation time information PTS (including the case of the presentation time information PTS converted into the value of 27 [MHz]), the decoding unit 84 also synchronizes a video signal and an audio signal obtained as a result of the decoding and outputs the video signal and the audio signal to the later stage.

<Content Reproduction Process by Content Reproduction Apparatus 70>

Next, FIG. 5 is a flow chart describing a content reproduction process by the content reproduction apparatus 70.

In step S11, the content acquisition unit 11 starts to receive the multiplexed stream corresponding to MMT or MPEG2 TS through the communication network 1 or the broadcast network 2. In step S12, the content acquisition unit 11 determines the acquisition source and the media transport scheme of the multiplexed stream started to be received. The content acquisition unit 11 also transfers the determination result to the selection control unit 79 of the clock recovery unit 75. The selection control unit 79 controls the output of the selection unit 81 on the basis of the determination result.

If the content acquisition unit 11 determines that the media transport scheme of the multiplexed stream is MMT in step S12, the process proceeds to step S13.

In step S13, the selection unit 14 outputs the multiplexed stream corresponding to MMT to the MMT demultiplexing unit 71. The MMT demultiplexing unit 71 separates the encoded data of the content from the multiplexed stream data and outputs the encoded data to the selection unit 74. The MMT demultiplexing unit 71 also separates the PSI equivalent from the multiplexed stream data and outputs the PSI equivalent to the selection unit 74. The MMT demultiplexing unit 71 further separates the reference time information NTP and the presentation time information PTS from the multiplexed stream data and outputs the reference time information NTP and the presentation time information PTS to the NTP/PTS conversion unit 72. The NTP/PTS conversion unit 72 converts the reference time information NTP and the presentation time information PTS into values on the value axis provided on the basis of 27 [MHz] that is a system clock frequency of MEPG2 TS and outputs the converted reference time information NTP and presentation time information PTS to the selection unit 74. The selection unit 74 outputs the encoded data input from the MMT demultiplexing unit 71 to the Host I/F unit 83 and outputs the PSI equivalent input from the MMT demultiplexing unit 71 as well as the converted reference time information NTP and presentation time information PTS input from the NTP/PTS conversion unit 72 to the clock recovery unit 75.

On the other hand, if the content acquisition unit 11 determines that the media transport scheme of the multiplexed stream is MPEG2 TS in step S12, the process proceeds to step S14.

In step S14, the selection unit 14 outputs the multiplexed stream corresponding to MPEG2 TS to the TS demultiplexing unit 73. The TS demultiplexing unit 73 separates the encoded data of the content from the multiplexed stream data and outputs the encoded data to the selection unit 74. The TS demultiplexing unit 73 also separates the PSI from the multiplexed stream data and outputs the PSI to the selection unit 74. The TS demultiplexing unit 73 further separates the reference time information PCR and the presentation time information PTS from the multiplexed stream data and outputs the reference time information PCR and the presentation time information PTS to the selection unit 74. The selection unit 74 outputs the encoded data input from the TS demultiplexing unit 73 to the Host I/F unit 83 and outputs the PSI as well as the reference time information PCR and the presentation time information PTS input from the TS demultiplexing unit 73 to the clock recovery unit 75.

In step S15, the clock recovery unit 75 corrects the system clock of 27 [MHz] through the control suitable for the transmission path and the media transport scheme on the basis of the reference time information NTP and the presentation time information PTS converted into the values based on 27 [MHz] as well as the PSI equivalent or on the basis of the reference time information PCR, the presentation time information PTS, and the PSI input from the selection unit 74 and outputs the system clock to the clock signal generation unit 82. The clock signal generation unit 82 generates a baseband clock signal necessary for decoding the encoded data on the basis of the system clock of 27 [MHz] and outputs the baseband clock signal to the decoding unit 84.

In step S16, the decoding unit 84 decodes the encoded data from the Host I/F unit 83 according to the baseband clock signal input from the clock signal generation unit 82. The decoding unit 84 also synchronizes the video signal and the audio signal obtained as a result of the decoding on the basis of the presentation time information PTS from the count comparison unit 78 (including the case of the presentation time information PTS converted into the value of 27 [MHz]) and outputs the video signal and the audio signal to the later stage. This completes the description of the content reproduction process by the content reproduction apparatus 70.

According to the content reproduction apparatus 70, the reference time information PCR and the presentation time information PTS can be used as they are to synchronize and output the AV signals for the multiplexed stream corresponding to MPEG2 TS received from the communication network 1 or the broadcast network 2. On the other hand, the reference time information NTP and the presentation time information PTS converted into the values based on 27 [MHz] can be used to synchronize and output the AV signals for the multiplexed stream corresponding to MMT.

The content reproduction apparatus 70 is provided with only the clock generation unit 76 that generates the system clock of 27 [MHz], and this can prevent the generation of EMI radiation and reduce the circuit scale.

Figure 6:
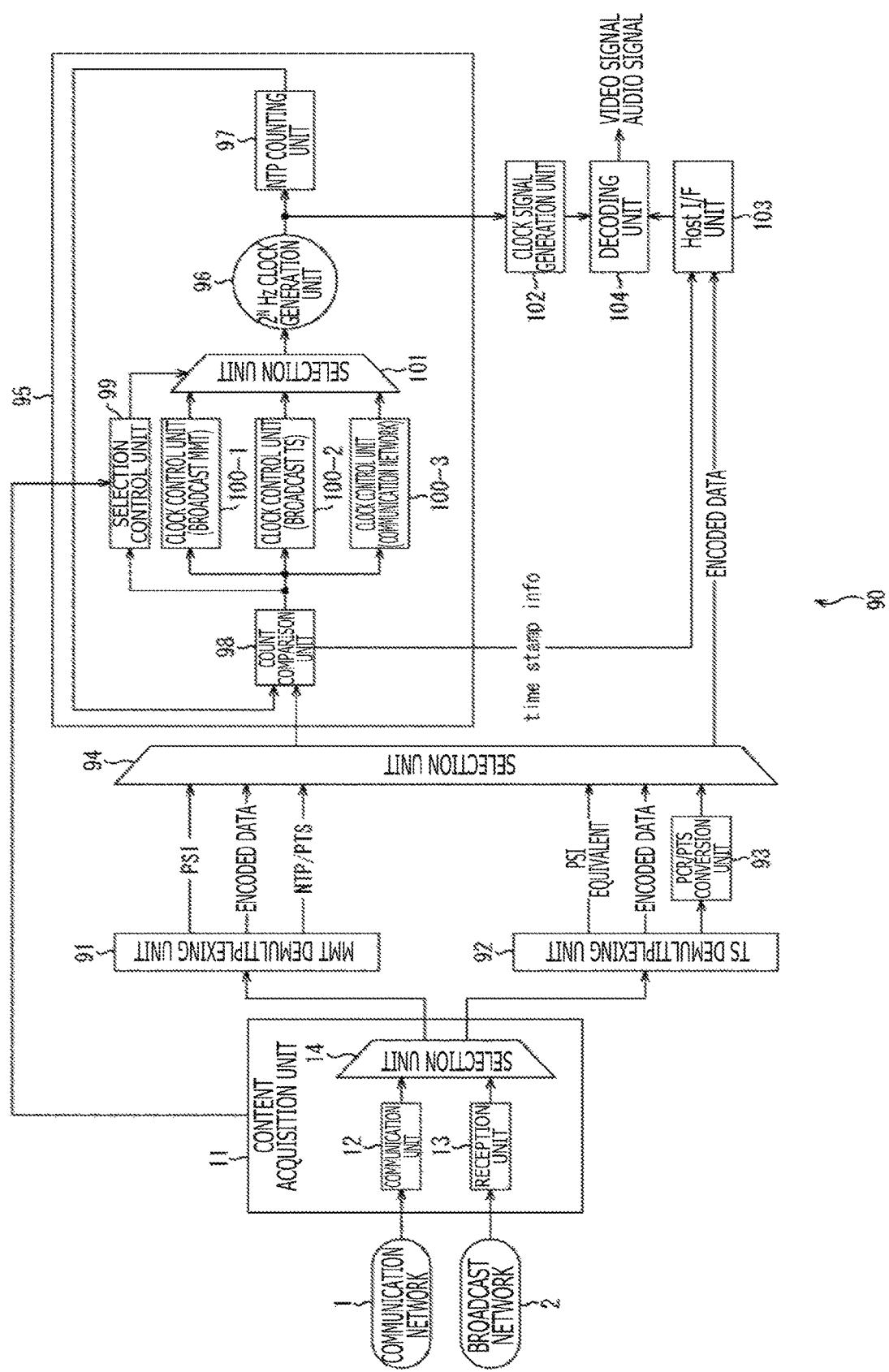
FIG. 6 is a block diagram illustrating a third configuration example of the content reproduction apparatus as an embodiment of the present disclosure.

Third Configuration Example of Content Reproduction Apparatus as Embodiment of Present Disclosure Next, FIG. 6 illustrates a third configuration example of the content reproduction apparatus as an embodiment of the present disclosure.

A content reproduction apparatus 90 is configured to correct and use a system clock of $2^N$ [Hz] generated by a built-in clock generation unit 96 on the basis of a reference time information PCR or NTP from a supply source (such as a broadcast station) of the content. Note that the same reference signs are provided to the constituent elements common to the content reproduction apparatus 90 and the content reproduction apparatus 70 illustrated in FIG. 4, and the description will be appropriately omitted.

The content reproduction apparatus 90 mainly includes the content acquisition unit 11, an MMT demultiplexing unit 91, a TS demultiplexing unit 92, a PCR/PTS conversion unit 93, a selection unit 94, a clock recovery unit 95, a clock signal generation unit 102, a Host I/F unit 103, and a decoding unit 104.

The communication unit 12 or the reception unit 13 in the content acquisition unit 11 acquires a multiplexed stream corresponding to MMT or MPEG2 TS through the communication network 1 or the broadcast network 2. The content acquisition unit 11 outputs the multiplexed stream corresponding to MMT to the MMT demultiplexing unit 91 and outputs the multiplexed stream corresponding to MPEG2 TS to the TS demultiplexing unit 92. The content acquisition unit 11 also transfers transmission route information to a selection control unit 99 of the clock recovery unit 95.

The MMT demultiplexing unit 91 separates encoded data of the content, a PSI equivalent, a reference time information NTP, and a presentation time information PTS from the multiplexed stream data corresponding to MMT and outputs them to the selection unit 94.

The TS demultiplexing unit 92 separates encoded data of the content from the multiplexed stream data corresponding to MPEG2 TS and outputs the encoded data to the selection unit 94. The TS demultiplexing unit 92 also separates PSI from the multiplexed stream data and outputs the PSI to the selection unit 94. The TS demultiplexing unit 92 also separates a reference time information PCR and a presentation time information PTS from the multiplexed stream data and outputs the reference time information PCR and the presentation time information PTS to the PCR/PTS conversion unit 93.

The PCR/PTS conversion unit 93 converts the reference time information PCR and the presentation time information PTS input from the TS demultiplexing unit 92 into values on the value axis provided on the basis of $2^N$[Hz] that is a system clock frequency of MMT and outputs the converted reference time information PCR and presentation time information PTS to the selection unit 94.

The selection unit 94 selects an input source of the series of data to be output to the later stage according to the media transport scheme of the multiplexed stream acquired by the content acquisition unit 11.

Specifically, in the case where the media transport scheme of the multiplexed stream is MMT, the selection unit 94 outputs the encoded data input from the MMT demultiplexing unit 91 to the Host I/F unit 103 and outputs the PSI equivalent as well as the reference time information NTP and the presentation time information PTS input from the MMT demultiplexing unit 91 to the clock recovery unit 95.

On the other hand, in the case where the media transport scheme of the multiplexed stream is MPEG2 TS, the selection unit 94 outputs the encoded data input from the TS demultiplexing unit 92 to the Host I/F unit 103 and outputs the PSI input from the TS demultiplexing unit 92 as well as the converted reference time information PCR and presentation time information PTS input from the PCR/PTS conversion unit 93 to the clock recovery unit 95.

The clock recovery unit 95 includes the clock generation unit 96, an NTP counting unit 97, a count comparison unit 98, the selection control unit 99, a clock control unit (broadcast MMT) 100-1, a clock control unit (broadcast TS) 100-2, a clock control unit (communication network) 100-3, and a selection unit 101.

The clock generation unit 96 generates a system clock of $2^N$ [Hz] corresponding to MMT and outputs the system clock to the NTP counting unit 97 and the clock signal generation unit 102. The NTP counting unit 97 increments an NTP count value according to the system clock of $2^N$ [Hz] and feeds back the NTP count value to the count comparison unit 98.

The count comparison unit 98 outputs a difference between the fed back NTP count value and the reference time information NTP input through the selection unit 94 as well as the PSI equivalent to the clock control unit (broadcast MMT) 100-1 and the clock control unit (communication network) 100-3. The count comparison unit 98 further outputs a difference between the fed back STC count value and the reference time information NTP input through the selection unit 74 to the selection control unit 99.

The count comparison unit 98 also outputs a difference between the fed back NTP count value and the converted reference time information PCR input through the selection unit 94 as well as the PSI to the clock control unit (broadcast TS) 100-2 and the clock control unit (communication network) 100-3. The count comparison unit 98 further outputs a difference between the fed back STC count value and the converted reference time information PCR input through the selection unit 74 to the selection control unit 99.

The count comparison unit 98 further sets, as Time Stamp Info, the reference time information NTP and the presentation time information PTS or the converted reference time information PCR and presentation time information PTS input through the selection unit 94 and outputs the Time Stamp Info to the Host I/F unit 103.

The selection control unit 99 controls the output of the selection unit 101 on the basis of the transmission route information transferred from the content acquisition unit 11 and on the basis of the difference from the STC count value input from the count comparison unit 98.

The clock control unit (broadcast MMT) 100-1 generates a control signal for executing a clock recovery process according to the transmission conditions, such as jitter characteristics, of the broadcast network 2 as a transmission path on the basis of the input from the count comparison unit 98 and outputs the control signal to the selection unit 101.

The clock control unit (broadcast TS) 100-2 generates a control signal for executing a clock recovery process according to the transmission conditions, such as jitter characteristics, of the broadcast network 2 as a transmission path on the basis of the input from the count comparison unit 98 and outputs the control signal to the selection unit 101.

The clock control unit (communication network) 100-3 generates a control signal for executing a clock recovery process according to the transmission conditions, such as jitter characteristics, of the communication network 1 as a transmission path on the basis of the input from the count comparison unit 98 and outputs the control signal to the selection unit 101.

The selection unit 101 selects an input source of the control signal to be output to the clock generation unit 96 according to the control by the selection control unit 99. Specifically, the selection unit 101 outputs the control signal input from the clock control unit (broadcast MMT) 100-1 to the clock generation unit 96 in the case where the acquisition source of the multiplexed stream is the broadcast network 2 and the media transport scheme is MMT. The selection unit 101 outputs the control signal input from the clock control unit (broadcast TS) 100-2 to the clock generation unit 96 in the case where the acquisition source of the multiplexed stream is the broadcast network 2 and the media transport scheme is MPEG2 TS. The selection unit 101 outputs the control signal input from the clock control unit (communication network) 100-3 to the clock generation unit 76 in the case where the acquisition source of the multiplexed stream is the communication network 1.

Therefore, the selection unit 94 and the selection unit 101 are basically switched at the same time according to the acquisition source of the multiplexed stream acquired by the content acquisition unit 11 and the media transport scheme. However, the selection unit 94 and the selection unit 101 may be separately switched. The selection unit 101 may be adaptively switched during the operation of reception and reproduction.

The clock signal generation unit 102 generates a baseband clock signal necessary for decoding the encoded data on the basis of the system clock of $2^N$ [Hz] and outputs the baseband clock signal to the decoding unit 84.

The Host I/F unit 103 outputs, to the decoding unit 104, the encoded data input through the selection unit 94 as well as the reference time information NTP and the presentation time information PTS or the converted reference time information PCR and presentation time information PTS input as the Time Stamp Info from the count comparison unit 98.

The decoding unit 104 decodes the encoded data according to the baseband clock signal input from the clock signal generation unit 102. The decoding unit 104 synchronizes a video signal and an audio signal obtained as a result of the decoding on the basis of the presentation time information PTS (including the case of the presentation time information PTS converted into the value of $2^N$ [Hz]) and outputs the video signal and the audio signal to the later stage.

<Content Reproduction Process by Content Reproduction Apparatus 90>

Next, FIG. 7 is a flow chart describing a content reproduction process by the content reproduction apparatus 90.

In step S21, the content acquisition unit 11 starts to receive the multiplexed stream corresponding to MMT or MPEG2 TS through the communication network 1 or the broadcast network 2. In step S22, the content acquisition unit 11 determines the acquisition source and the media transport scheme of the multiplexed stream started to be received. The content acquisition unit 11 also transfers the determination result to the selection control unit 99 of the clock recovery unit 95. The selection control unit 99 controls the output of the selection unit 101 on the basis of the determination result.

If the content acquisition unit 11 determines that the media transport scheme of the multiplexed stream is MPEG2 TS in step S22, the process proceeds to step S23.

In step S23, the selection unit 14 outputs the multiplexed stream corresponding to MPEG2 TS to the TS demultiplexing unit 92. The TS demultiplexing unit 92 separates the encoded data of the content from the multiplexed stream data and outputs the encoded data to the selection unit 94. The TS demultiplexing unit 92 also separates the PSI from the multiplexed stream data and outputs the PSI to the selection unit 94. The TS demultiplexing unit 92 further separates the reference time information PCR and the presentation time information PTS from the multiplexed stream data and outputs the reference time information PCR and the presentation time information PTS to the PCR/PTS conversion unit 93. The PCR/PTS conversion unit 93 converts the reference time information PCR and the presentation time information PTS into values on the value axis provided on the basis of $2^N$ [Hz] that is a system clock frequency of MMT and outputs the converted reference time information PCR and presentation time information PTS to the selection unit 94. The selection unit 94 outputs the encoded data input from the TS demultiplexing unit 92 to the Host I/F unit 103 and outputs the PSI input from the TS demultiplexing unit 92 as well as the converted reference time information PCR and presentation time information PTS input from the PCR/PTS conversion unit 93 to the clock recovery unit 95.

On the other hand, if the content acquisition unit 11 determines that the media transport scheme of the multiplexed stream is MMT in step S22, the process proceeds to step S24.

In step S24, the selection unit 14 outputs the multiplexed stream corresponding to MMT to the MMT demultiplexing unit 91. The MMT demultiplexing unit 91 separates the encoded data of the content from the multiplexed stream data and outputs the encoded data to the selection unit 94. The MMT demultiplexing unit 91 also separates the PSI equivalent from the multiplexed stream data and outputs the PSI equivalent to the selection unit 94. The MMT demultiplexing unit 91 further separates the reference time information NTP and the presentation time information PTS from the multiplexed stream data and outputs the reference time information NTP and the presentation time information PTS to the selection unit 94. The selection unit 94 outputs the encoded data input from the MMT demultiplexing unit 91 to the Host I/F unit 103 and outputs the PSI equivalent as well as the reference time information NTP and the presentation time information PTS input from the MMT demultiplexing unit 91 to the clock recovery unit 95.

In step S25, the clock recovery unit 95 corrects the system clock of $2^N$ [Hz] through the control suitable for the transmission path or the media transport scheme on the basis of the reference time information NTP, the presentation time information PTS, and the PSI equivalent or on the basis of the reference time information PCR and the presentation time information PTS converted into the values based on $2^N$ [Hz] as well as the PSI input from the selection unit 94 and outputs the system clock to the clock signal generation unit 102. The clock signal generation unit 102 generates a baseband clock signal necessary for decoding the encoded data on the basis of the system clock of $2^N$ [Hz] and outputs the baseband clock signal to the decoding unit 104.

In step S26, the decoding unit 104 decodes the encoded data from the Host I/F unit 103 according to the baseband clock signal input from the clock signal generation unit 102. The decoding unit 104 also synchronizes the video signal and the audio signal obtained as a result of the decoding on the basis of the presentation time information PTS (including the case of the presentation time information PTS converted into the value of $2^N$ [Hz]) from the count comparison unit 98 and outputs the video signal and the audio signal to the later stage. This completes the description of the content reproduction process by the content reproduction apparatus 90.

According to the content reproduction apparatus 90, the reference time information NTP and the presentation time information PTS can be used as they are to synchronize and output the AV signals for the multiplexed stream corresponding to MMT received from the communication network 1 or the broadcast network 2. On the other hand, the reference time information PCR and the presentation time information PTS converted into the values based on $2^N$ [Hz] can be used to synchronize and output the AV signals for the multiplexed stream corresponding to MEPG2 TS.

The content reproduction apparatus 90 is provided with only the clock generation unit 96 that generates the system clock of $2^N$ [Hz], and this can prevent the generation of EMI radiation and reduce the circuit scale.

Fourth Configuration Example of Content Reproduction Apparatus as Embodiment of Present Disclosure Next, FIG. 8 illustrates a fourth configuration example of a content reproduction apparatus as an embodiment of the present disclosure.

A content reproduction apparatus 120 can correct and use a system clock of $2^N$ [Hz] generated by a built-in clock generation unit 133 on the basis of a reference time information PCR or NTP from a supply source (such as a broadcast station) of the content, similar to the content reproduction apparatus 90 of FIG. 6.

When the content reproduction apparatus 120 reproduces the multiplexed stream of MPEG2 TS recorded in the recording medium 3, the content reproduction apparatus 120 can further convert a vertical synchronization (frame synchronization) periodic signal and a horizontal synchronization periodic signal separated from an external reference signal (Ref. signal) 4 with a frequency different from 27 [MHz] and $2^N$ [Hz] into values based on $2^N$ [Hz] to generate external reference time information to thereby adjust the system clock.

Here, the external reference signal 4 denotes, for example, an analog Ref. signal (such as a black burst signal) supplied to an imaging device, a reproduction device, and the like for synchronizing the devices in an editing site, such as a broadcast station, where a plurality of videos are switched.

The content reproduction apparatus 120 mainly includes a content acquisition unit 121, an MMT demultiplexing unit 127, a TS demultiplexing unit 128, a PCR/PTS conversion unit 129, a Ref. signal conversion unit 130, a selection unit 131, a clock recovery unit 132, a clock signal generation unit 140, a Host I/F unit 141, and a decoding unit 142.

The content acquisition unit 121 includes a communication unit 122, a reception unit 123, a media drive 124, and a selection unit 126.

The communication unit 122 acquires a multiplexed stream corresponding to MMT or MPEG2 TS through the communication network 1 represented by the Internet and outputs the multiplexed stream to the selection unit 126. The reception unit 123 receives the multiplexed stream corresponding to MMT or MPEG2 TS through the broadcast network 2, such as a terrestrial broadcast network, a satellite broadcast network, and a CATV network, and outputs the multiplexed stream to the selection unit 126. The media drive 124 reads the multiplexed stream corresponding to MPEG2 TS from the recording medium 3 while performing buffer management based on a baseband clock signal supplied from the clock signal generation unit 140 and outputs the multiplexed stream to the selection unit 126.

The selection unit 126 selects an output destination of the multiplexed stream input from the earlier stage according to the media transport scheme (or format scheme) of the multiplexed stream. Specifically, the selection unit 126 outputs the multiplexed stream corresponding to MMT to the MMT demultiplexing unit 127 and outputs the multiplexed stream corresponding to MPEG2 TS to the TS demultiplexing unit 128.

The content acquisition unit 121 transfers transmission route information to a selection control unit 136 of the clock recovery unit 132.

The MMT demultiplexing unit 127 separates encoded data of the content, a PSI equivalent, a reference time information NTP, and a presentation time information PTS from the multiplexed stream data corresponding to MMT and outputs them to the selection unit 33.

The TS demultiplexing unit 128 separates encoded data of the content from the multiplexed stream data corresponding to MPEG2 TS and outputs the encoded data to the selection unit 131. The TS demultiplexing unit 128 also separates PSI from the multiplexed stream data and outputs the PSI to the selection unit 131. The TS demultiplexing unit 128 further separates reference time information PCR and presentation time information PTS from the multiplexed stream data and outputs the reference time information PCR and the presentation time information PTS to the PCR/PTS conversion unit 93.

The PCR/PTS conversion unit 129 converts the reference time information PCR and the presentation time information PTS input from the TS demultiplexing unit 128 into values on the value axis provided on the basis of $2^N$ [Hz] that is a system clock frequency of MMT and outputs the converted reference time information PCR and presentation time information PTS to the selection unit 131.

The Ref. signal conversion unit 130 separates the vertical synchronization periodic signal and the horizontal synchronization periodic signal from the external reference signal 4 supplied from the outside and converts the signals into values on the value axis provided on the basis of $2^N$ [Hz] that is a system clock frequency of MMT. The Ref. signal conversion unit 130 generates external reference time information on the basis of the converted vertical synchronization periodic signal and horizontal synchronization periodic signal and outputs the external reference time information to the selection unit 131.

The selection unit 131 selects an input source of the series of data to be output to the later stage according to the media transport scheme or the format scheme of the multiplexed stream acquired by the content acquisition unit 121.

Specifically, in the case where the multiplexed stream is MMT, the selection unit 131 outputs the encoded data input from the MMT demultiplexing unit 127 to the Host I/F unit 141 and outputs the PSI equivalent as well as the reference time information NTP and the presentation time information PTS input from the MMT demultiplexing unit 127 to the clock recovery unit 132.

On the other hand, in the case where the multiplexed stream is MEPG2 TS, the selection unit 131 outputs the encoded data input from the TS demultiplexing unit 128 to the Host I/F unit 141 and outputs the PSI input from the TS demultiplexing unit 128 as well as the converted reference time information PCR and presentation time information PTS input from the PCR/PTS conversion unit 129 to the clock recovery unit 132.

In the case where the external reference time information is input from the Ref. signal conversion unit 130, the selection unit 131 further outputs the external reference time information to the clock recovery unit 132.

The clock recovery unit 132 includes the clock generation unit 133, an NTP counting unit 134, a count comparison unit 135, the selection control unit 136, a clock control unit (broadcast MMT) 137-1, a clock control unit (broadcast TS) 137-2, a clock control unit (external Ref.) 137-3, a clock control unit (communication network) 137-4, a clock control unit (self-propel) 138, and a selection unit 139.

The clock generation unit 133 generates a system clock of $2^N$ [Hz] corresponding to MMT and outputs the system clock to the NTP counting unit 134 and the clock signal generation unit 140. The NTP counting unit 134 increments an NTP count value according to the system clock of $2^N$ [Hz] and feeds back the NTP count value to the count comparison unit 135.

The count comparison unit 135 outputs a difference between the fed back NTP count value and the reference time information NTP input through the selection unit 131 as well as the PSI equivalent to the clock control unit (broadcast MMT) 137-1 and the clock control unit (communication network) 137-4. The count comparison unit 135 further outputs a difference between the fed back NTP count value and the reference time information NTP input through the selection unit 131 to the selection control unit 136.

The count comparison unit 135 also outputs a difference between the fed back NTP count value and the converted reference time information PCR input trough the selection unit 131 as well as the PSI to the clock control unit (broadcast TS) 137-2 and the clock control unit (communication network) 137-4. The count comparison unit 135 further outputs a difference between the fed back NTP count value and the converted reference time information PCR input through the selection unit 131 to the selection control unit 136.

The count comparison unit 135 also outputs the external reference time information from the Ref. signal conversion unit 130 to the clock control unit (external Ref.) 137-3.

The count comparison unit 135 further sets, as Time Stamp Info, the reference time information NTP and the presentation time information PTS or the converted reference time information PCR and presentation time information PTS input through the selection unit 131 and outputs the Time Stamp Info to the Host I/F unit 141.

The selection control unit 136 controls the output of the selection unit 139 on the basis of the transmission route information transferred from the content acquisition unit 121 and on the basis of the difference from the NTP count value input from the count comparison unit 135.

The clock control unit (broadcast MMT) 137-1 generates a control signal for executing a clock recovery process according to the transmission conditions, such as jitter characteristics, of the broadcast network 2 as a transmission path on the basis of the difference between the NTP count value and the reference time information NTP as well as the PSI equivalent input from the count comparison unit 135 and outputs the control signal to the selection unit 139.

The clock control unit (broadcast TS) 137-2 generates a control signal for executing a clock recovery process according to the transmission conditions, such as jitter characteristics, of the broadcast network 2 as a transmission path on the basis of the difference between the NTP count value and the converted reference time information PCR as well as the PSI input from the count comparison unit 135 and outputs the control signal to the selection unit 139.

The clock control unit (external Ref.) 137-3 generates a control signal suitable for synchronization with the external reference signal on the basis of the input from the count comparison unit 135 and outputs the control signal to the selection unit 139.

The clock control unit (communication network) 137-4 generates a control signal for executing a clock recovery process according to the transmission conditions, such as jitter characteristics, of the communication network 1 as a transmission path on the basis of the input from the count comparison unit 135 and outputs the control signal to the selection unit 139.

The clock control unit (self-propel) 138 generates a control signal for the clock generation unit 133 to self-propel without depending on the reference time information NTP or the PCR or without depending on the external reference time information and outputs the control signal to the selection unit 139.

The selection unit 139 selects an input source of the control signal to be output to the clock generation unit 139 according to the control by the selection control unit 136. Specifically, the selection unit 139 outputs the control signal input from the clock control unit (broadcast MMT) 137-1 to the clock generation unit 133 in the case where the acquisition source of the multiplexed stream is the broadcast network 2 and the media transport scheme is MMT. The selection unit 139 outputs the control signal input from the clock control unit (broadcast TS) 137-2 to the clock generation unit 133 in the case where the acquisition source of the multiplexed stream is the broadcast network 2 and the media transport scheme is MPEG2 TS. The selection unit 139 outputs the control signal input from the clock control unit (external Ref.) 137-3 to the clock generation unit 133 in the case where the control signal is synchronized with the external reference signal 4.

Furthermore, the selection unit 139 outputs the control signal input from the clock control unit (communication network) 137-4 to the clock generation unit 133 in the case where the acquisition source of the multiplexed stream is the communication network 1. In addition, the selection unit 139 outputs the control signal input from the clock control unit (self-propel) 138 to the clock generation unit 133 to cause the clock generation unit 133 to self-propel.

Therefore, the selection unit 131 and the selection unit 139 are basically switched at the same time according to the media transport scheme (format scheme) of the multiplexed stream acquired by the content acquisition unit 121. However, the selection unit 131 and the selection unit 139 may be separately switched. The selection unit 139 may be adaptively switched during the operation of reception and reproduction.

The clock signal generation unit 140 generates a baseband clock signal necessary for decoding the encoded data on the basis of the system clock of $2^N$ [Hz] and outputs the baseband clock signal to the media drive 124 and the decoding unit 142.

The Host I/F unit 141 outputs the encoded data input through the selection unit 131 and the Time Stamp Info input from the count comparison unit 135 to the decoding unit 142.

The decoding unit 142 decodes the encoded data according to the baseband clock signal input from the clock signal generation unit 140. The decoding unit 142 synchronizes a video signal and an audio signal obtained as a result of the decoding on the basis of the presentation time information PTS (including the case of the presentation time information PTS converted into the value of $2^N$ [Hz]) and outputs the video signal and the audio signal to the later stage.

<Content Reproduction Process by Content Reproduction Apparatus 120>

The content reproduction process by the content reproduction apparatus 120 is similar to the content reproduction process by the content reproduction apparatus 90 described with reference to FIG. 7. However, in the case where the content is reproduced from the recording medium 3, the system clock can be synchronized with the external reference signal 4, and the AV signals synchronized with other devices provided with the common external reference signal 4 can be output to the later stage.

CONCLUSION

According to the content reproduction apparatuses 50, 70, 90, and 120 of the present embodiment described above, the generation source of the system clock is a single system, and this can realize a simplified and small-scale circuit configuration. As a result, the manufacturing cost and the power consumption can be reduced. Furthermore, measures for the EMI radiation can be easily taken.

Note that the embodiment of the present disclosure is not limited to the embodiment described above, and various changes can be made without departing from the scope of the present disclosure.

The present disclosure can also be configured as follows.

(1)

A content reproduction apparatus including:

an acquisition unit that acquires a first multiplexed stream generated on the basis of a first system clock with a first frequency;

a demultiplexing unit that separates encoded data and presentation time information from the acquired first multiplexed stream;

a system clock generation unit that generates a second system clock with a second frequency different from the first frequency;

a conversion unit that numerically converts the presentation time information separated from the first multiplexed stream into a value on an axis of the second frequency; and a decoding unit that decodes the encoded data separated from the first multiplexed stream and that presents, according to the numerically converted presentation time information, a decoded signal obtained as a result of the decoding.

(2)

The content reproduction apparatus according to (1), in which the acquisition unit also acquires a second multiplexed stream generated on the basis of the second system clock, the demultiplexing unit also separates encoded data and presentation time information from the acquired second multiplexed stream, and the decoding unit decodes the encoded data separated from the second multiplexed stream and presents a decoded signal obtained as a result of the decoding according to the presentation time information separated from the second multiplexed stream.

(3)

The content reproduction apparatus according to (1) or (2), in which the demultiplexing unit further separates reference time information from the acquired first multiplexed stream, the conversion unit also numerically converts the reference time information separated from the first multiplexed stream into a value on the axis of the second frequency, and the content reproduction apparatus further includes a clock control unit that controls the system clock generation unit that generates the second system clock on the basis of the numerically converted reference time information.

(4)

The content reproduction apparatus according to (3), in which the demultiplexing unit also further separates reference time information from the acquired second multiplexed stream, and the clock control unit further controls the system clock generation unit that generates the second system clock on the basis of the reference time information separated from the second multiplexed stream.

(5)

The content reproduction apparatus according to any one of (2) to (4), in which the clock control unit further controls the system clock generation unit that generates the second system clock according to transmission route information of the acquired first or second multiplexed stream.

(6)

The content reproduction apparatus according to any one of (2) to (5), further including:

an external reference time information generation unit that numerically converts, into a value on the axis of the second frequency, a synchronization signal separated from an external reference signal with a third frequency different from the first and second frequencies and that generates external reference time information on the basis of the numerically converted synchronization signal, in which the clock control unit further controls the system clock generation unit that generates the second system clock on the basis of the generated external reference time information.

(7)
The content reproduction apparatus according to any one of (2) to (6), in which
the clock control unit further controls the system clock generation unit that generates the second system clock such that the system clock generation unit self-propels.

(8)
The content reproduction apparatus according to any one of (2) to (7), in which
the first frequency is 27 [MHz], a media transport scheme of the first multiplexed stream is MPEG-2 TS, the reference time information separated from the first multiplexed stream is PCR, and the presentation time information separated from the first multiplexed stream is PTS, and
the second frequency is $2^N$ [Hz], a media transport scheme of the second multiplexed stream is MMT, the reference time information separated from the second multiplexed stream is NTP, and the presentation time information separated from the second multiplexed stream is PTS.

(9)
The content reproduction apparatus according to any one of (2) to (7), in which
the first frequency is $2^N$ [Hz], the media transport scheme of the first multiplexed stream is MMT, the reference time information separated from the first multiplexed stream is NTP, and the presentation time information separated from the first multiplexed stream is PTS, and
the second frequency is 27 [MHz], the media transport scheme of the second multiplexed stream is MPEG-2 TS, the reference time information separated from the second multiplexed stream is PCR, and the presentation time information separated from the second multiplexed stream is PTS.

(10)
A content reproduction method of a content reproduction apparatus executed by the content reproduction apparatus, the content reproduction method including:
an acquisition step of acquiring a first multiplexed stream generated on the basis of a first system clock with a first frequency;
a demultiplexing step of separating encoded data and presentation time information from the acquired first multiplexed stream;
a conversion step of numerically converting the presentation time information separated from the first multiplexed stream into a value on an axis of a second frequency different from the first frequency generated by a system clock generation unit;
a decoding step of decoding the encoded data separated from the first multiplexed stream; and
a presentation step of presenting, according to the numerically converted presentation time information, a decoded signal obtained as a result of the decoding.

REFERENCE SIGNS LIST

1 Communication network, 2 Broadcast network, 3 Recording medium, 50 Content reproduction apparatus, 51 Content acquisition unit, 54 PTS conversion unit, 56 Clock generation unit, 70 Content reproduction apparatus, 72 NTP/PCR conversion unit, 75 Clock recovery unit, 76 Clock generation unit, 90 Content reproduction apparatus, 93 PCR/PTS conversion unit, 95 Clock recovery unit, 96 Clock generation unit, 120 Content reproduction apparatus, 129 PCR/PTS conversion unit, 130 Ref. signal conversion unit, 132 Clock recovery unit, 133 Clock generation unit

The invention claimed is:

1. A content reproduction apparatus comprising:
an acquisition circuitry configured to acquire a first multiplexed stream generated on the basis of a first system clock with a first frequency;
a demultiplexing circuitry configured to separate encoded data and presentation time information from the acquired first multiplexed stream;
a system clock generation circuitry configured to generate a second system clock with a second frequency different from the first frequency;
a conversion circuitry configured to numerically convert the presentation time information separated from the first multiplexed stream into a value on an axis of the second frequency; and
a decoding circuitry configured to
decode the encoded data separated from the first multiplexed stream, and
present, according to the numerically converted presentation time information, a decoded signal obtained as a result of the decoding,
wherein the acquisition circuitry is further configured to acquire a second multiplexed stream generated on the basis of the second system clock,
wherein the demultiplexing circuitry is further configured to separate encoded data and presentation time information from the acquired second multiplexed stream, and
wherein the decoding circuitry is further configured to
decode the encoded data separated from the second multiplexed stream, and
present a second decoded signal obtained as a result of the decoding according to the presentation time information separated from the second multiplexed stream.

2. The content reproduction apparatus according to claim 1, wherein
the demultiplexing circuitry further separates reference time information from the acquired first multiplexed stream,
the conversion circuitry also numerically converts the reference time information separated from the first multiplexed stream into a value on the axis of the second frequency, and
the content reproduction apparatus further comprises a clock control circuitry that controls the system clock generation circuitry that generates the second system clock on the basis of the numerically converted reference time information.

3. The content reproduction apparatus according to claim 2, wherein
the demultiplexing circuitry also further separates reference time information from the acquired second multiplexed stream, and
the clock control circuitry further controls the system clock generation circuitry that generates the second system clock on the basis of the reference time information separated from the second multiplexed stream.

4. The content reproduction apparatus according to claim 3, wherein
the clock control circuitry further controls the system clock generation circuitry that generates the second system clock according to transmission route information of the acquired first multiplexed stream or the acquired second multiplexed stream.

5. The content reproduction apparatus according to claim 4, further comprising:

an external reference time information generation circuitry that numerically converts, into a second value on the axis of the second frequency, a synchronization signal separated from an external reference signal with a third frequency different from the first and second frequencies and that generates external reference time information on the basis of the numerically converted synchronization signal, wherein the clock control circuitry further controls the system clock generation circuitry that generates the second system clock on the basis of the generated external reference time information.

6. The content reproduction apparatus according to claim 5, wherein the clock control circuitry further controls the system clock generation circuitry that generates the second system clock such that the system clock generation circuitry is configured to self-propel.

7. The content reproduction apparatus according to claim 1, wherein the first frequency is 27 [MHz], a media transport scheme of the first multiplexed stream is MPEG-2 Transport Stream (TS), the reference time information separated from the first multiplexed stream is Program Clock Reference (PCR), and the presentation time information separated from the first multiplexed stream is Presentation Time Stamp (PTS), and the second frequency is $2^N$ [Hz], a media transport scheme of the second multiplexed stream is MPEG Media Transport (MMT), the reference time information separated from the second multiplexed stream is Network Time Protocol (NTP), and the presentation time information separated from the second multiplexed stream is PTS.

8. The content reproduction apparatus according to claim 1, wherein the first frequency is $2^N$ [Hz], the media transport scheme of the first multiplexed stream is MPEG Media Transport (MMT), the reference time information separated from the first multiplexed stream is Network Time Protocol (NTP), and the presentation time information separated from the first multiplexed stream is Presentation Time Stamp (PTS), and the second frequency is 27 [MHz], the media transport scheme of the second multiplexed stream is MPEG-2 Transport Stream (TS), the reference time information separated from the second multiplexed stream is Program Clock Reference (PCR), and the presentation time information separated from the second multiplexed stream is PTS.

9. A content reproduction method of a content reproduction apparatus executed by the content reproduction apparatus, the content reproduction method comprising:

acquiring a first multiplexed stream generated on the basis of a first system clock with a first frequency;

separating encoded data and presentation time information from the acquired first multiplexed stream;

generating a second system clock with a second frequency different from the first frequency;

numerically converting the presentation time information separated from the first multiplexed stream into a value on an axis of the second frequency different from the first frequency generated by a system clock generation circuitry;

decoding the encoded data separated from the first multiplexed stream;

presenting, according to the numerically converted presentation time information, a decoded signal obtained as a result of the decoding;

acquiring a second multiplexed stream generated on the basis of the second system clock;

separating encoded data and presentation time information from the acquired second multiplexed stream;

decoding the encoded data separated from the second multiplexed stream; and presenting a second decoded signal obtained as a result of the decoding according to the presentation time information separated from the second multiplexed stream.

10. The content reproduction method according to claim 9, further comprising:

separating reference time information from the acquired first multiplexed stream;

numerically converting the reference time information separated from the first multiplexed stream into a value on the axis of the second frequency; and controlling the system clock generation circuitry that generates the second system clock on the basis of the numerically converted reference time information.

11. The content reproduction method according to claim 10, further comprising:

separating reference time information from the acquired second multiplexed stream; and controlling the system clock generation circuitry that generates the second system clock on the basis of the reference time information separated from the second multiplexed stream.

12. The content reproduction method according to claim 11, further comprising controlling the system clock generation circuitry that generates the second system clock according to transmission route information of the acquired first multiplexed stream or the acquired second multiplexed stream.

13. The content reproduction method according to claim 12, further comprising:

numerically converting, into a second value on the axis of the second frequency, a synchronization signal separated from an external reference signal with a third frequency different from the first and second frequencies and that generates external reference time information on the basis of the numerically converted synchronization signal; and controlling the system clock generation circuitry that generates the second system clock on the basis of the generated external reference time information.

14. The content reproduction method according to claim 13, further comprising controlling the system clock generation circuitry that generates the second system clock such that the system clock generation circuitry is configured to self-propel.

15. The content reproduction method according to claim 9, wherein the first frequency is 27 [MHz], a media transport scheme of the first multiplexed stream is MPEG-2 Transport Stream (TS), the reference time information separated from the first multiplexed stream is Program Clock Reference (PCR), and the presentation time information separated from the first multiplexed stream is Presentation Time Stamp (PTS), and the second frequency is $2^N$ [Hz], a media transport scheme of the second multiplexed stream is MPEG Media Transport (MMT), the reference time information separated from the second multiplexed stream is Network Time Protocol (NTP), and the presentation time information separated from the second multiplexed stream is PTS.

16. The content reproduction method according to claim 9, wherein
the first frequency is $2^N$ [Hz], the media transport scheme of the first multiplexed stream is MPEG Media Transport (MMT), the reference time information separated from the first multiplexed stream is Network Time Protocol (NTP), and the presentation time information separated from the first multiplexed stream is Presentation Time Stamp (PTS), and
the second frequency is 27 [MHz], the media transport scheme of the second multiplexed stream is MPEG-2 Transport Stream (TS), the reference time information separated from the second multiplexed stream is Program Clock Reference (PCR), and the presentation time information separated from the second multiplexed stream is PTS.

* * * * *